Aug. 17, 1937.         M. P. DE MOTTE         2,090,575
                           MOTOR
              Filed Oct. 24, 1931       2 Sheets-Sheet 1
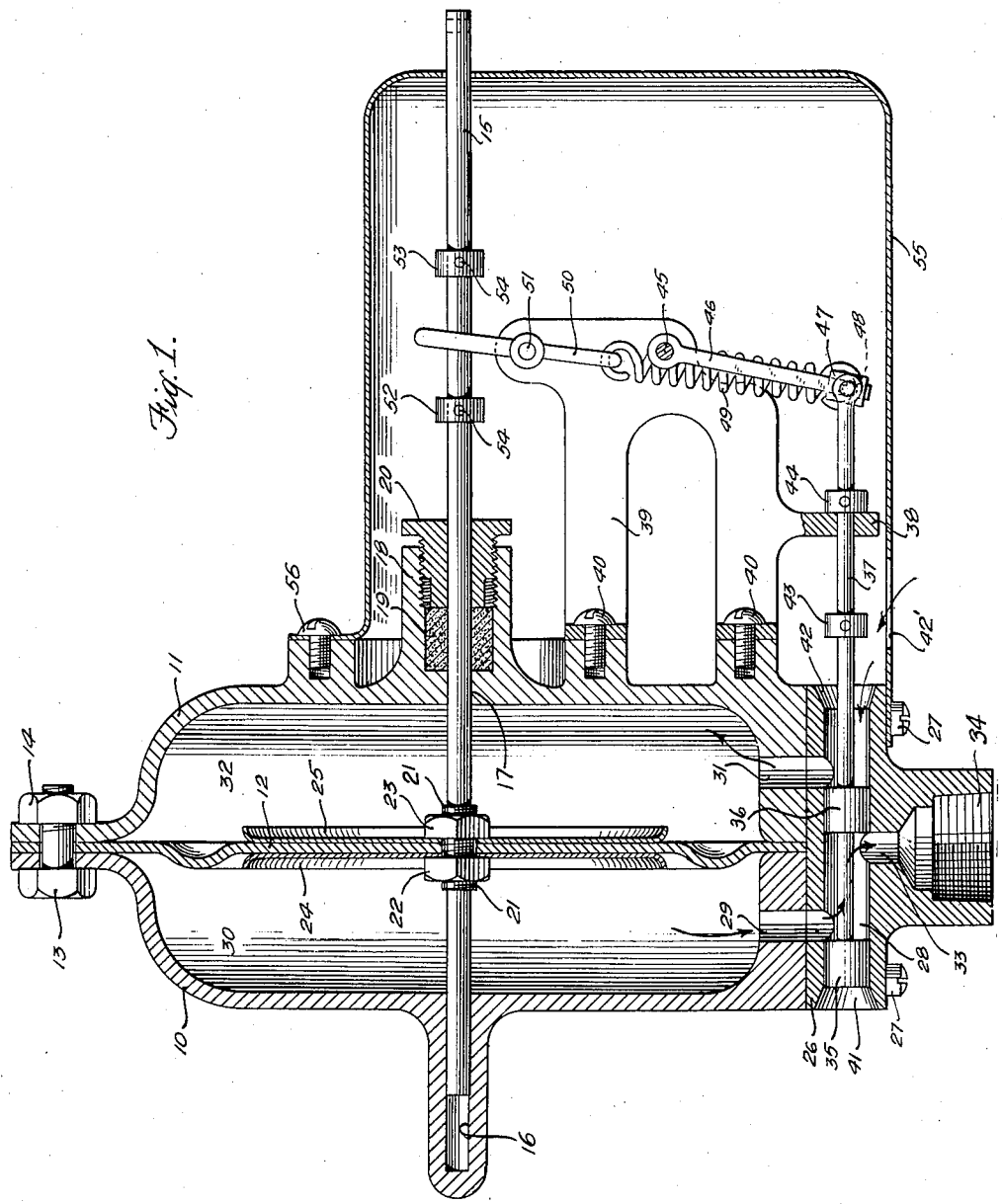
INVENTOR:
Maurice P. De Motte,
BY   ATTORNEYS Aug. 17, 1937.  M. P. DE MOTTE  2,090,575
MOTOR
Filed Oct. 24, 1931  2 Sheets-Sheet 2
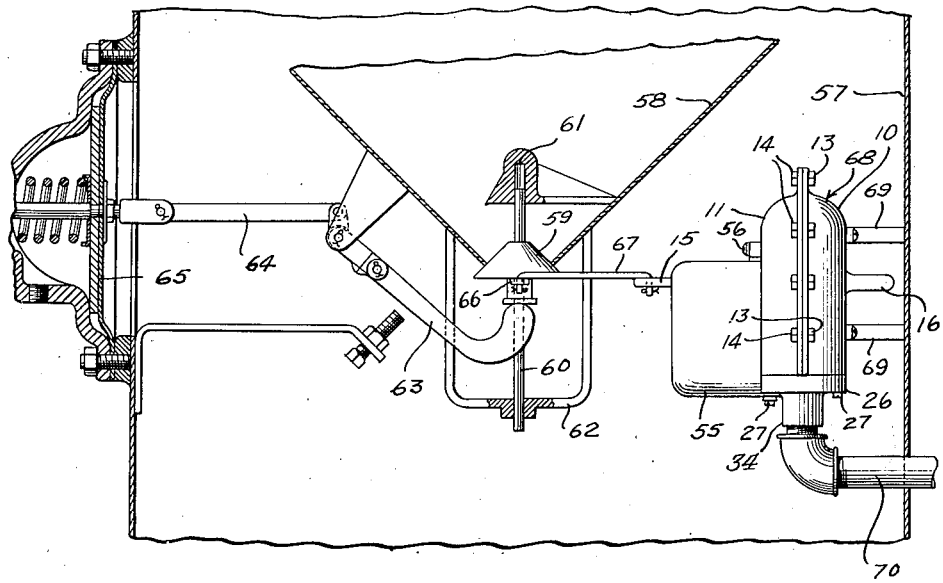
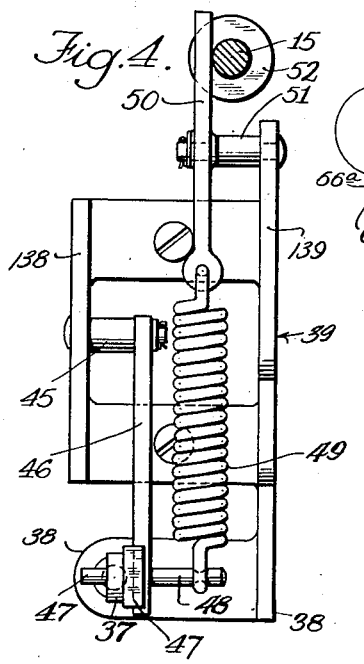
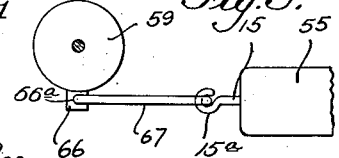
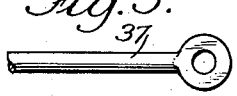
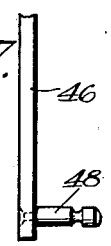
INVENTOR:
Maurice P. De Motte,
BY  ATTORNEYS
Byrnes Townsend & Potter.

Patented Aug. 17, 1937

2,090,575

UNITED STATES PATENT OFFICE 2,090,575

MOTOR

Maurice P. De Motte, Indianapolis, Ind., assignor, by mesne assignments, to Union Carbide and Carbon Corporation, a corporation of New York Application October 24, 1931, Serial No. 570,929

5 Claims. (Cl. 121—48)

This invention relates to a fluid pressure motor that derives power from the movement of gas drawn from an acetylene generator to actuate the carbide feed valve thereof.

One object of the invention is to provide a motor having a speed proportional to the amount of gas drawn from the generator. Another object is to provide a motor that is not affected by moisture that condenses therein. Other objects are to provide a motor that is simple in structure, economical to manufacture, positive in action, and reliable in operation. Still other aims, objects, and novel features will be apparent from the following specification and the accompanying illustration, in which Fig. 1 is a vertical sectional view of my improved motor, Fig. 2 is a fragmentary vertical sectional view of an acetylene generator having my improved motor therein, Fig. 3 is a fragmentary plan view of a detail of the connection between my improved motor and the carbide valve shown in Fig. 2.

Fig. 4 is an end view of the valve trip mechanism shown in Fig. 1,

Fig. 5 is a fragmentary view of the outer end of valve shaft 37,

Fig. 6 is an isolated view of yoke 47,

Fig. 7 is a fragmentary view of the lower end of thrust arm 46 with stud 48 therein.

This motor has two chambers separated by a movable diaphragm that controls a valve for admitting gas to first one chamber and then the other. The movement of the valve is controlled by means of a spring that holds it at either limit of its range of movement and moves it quickly from one limit to the other.

For convenience the motor is mounted within the generator casing and gas enters the two chambers through two inlets and leaves the chambers through an outlet that is also the outlet for the acetylene generator. The valve comprises two spaced pistons on a valve shaft that is provided with an exterior guide and two stop collars to limit its range of movement. The motor shaft is carried by a bearing at each side of the diaphragm to which it is attached, and one bearing is provided with a suitable packing. This shaft is indirectly connected to the carbide valve and is also provided with two trip collars to trip the valve mechanism.

The valve mechanism comprises a spring carried under tension between a trip arm movable by the trip collars and a thrust arm that moves the valve shaft. During operation gas enters one of the chambers and moves the diaphragm in one direction until one trip collar has moved the trip spring past the center line of the thrust arm and the trip spring has moved the valve shaft to the other limit of its range of movement. This admits gas to the opposite side of the diaphragm which then moves in the other direction until the valve is again tripped. The spring precludes arrest of the valve in a dead center position.

One example of my improved motor is shown in Fig. 1. This motor comprises two housing sections 10 and 11 having complementary vertical faces with a cavity in each between which a flexible diaphragm 12 is clamped by means of a plurality of bolts 13 and nuts 14. A horizontal shaft or piston rod 15 is carried in a bearing or socket 16 in housing section 10 and passes through the diaphragm 12 and a bearing 17 in housing section 11. This shaft extends some distance beyond the motor and is connected to the carbide valve of the generator by means that will be described later, and bearing 17 is provided with a gland 18 having a packing 19 and an adjustable gland nut 20.

A portion of shaft 15 adjacent diaphragm 12 is provided with a threaded enlargement 21 upon which nuts 22 and 23 are threaded to clamp diaphragm supports 24 and 25 to each side of the diaphragm, respectively.

A valve casing 26 is secured to the under side of housing sections 10 and 11 by a plurality of cap screws or bolts 27. This casing has a horizontal cylindrical valve passage 28 extending therethrough below chambers 30 and 32. A vertical valve port 29 connects the top of this passage with the bottom of chamber 30 in housing section 10 and a similar valve port 31 connects this passage with chamber 32 in housing section 11 in a similar manner. A vertical exhaust port 33 also connects the bottom of this passage with outlet 34 and this exhaust port 33 enters the valve passage 28 between valve ports 29 and 31. Valve passage 28 is provided with a valve comprising spaced pistons 35 and 36 carried by or integral with a valve stem or shaft 37. This shaft is supported outside the valve passage 28 by a projection 38 depending from a valve trip mechanism support 39 attached to housing 11 by a plurality of screws or bolts 40. The open ends of valve passage 28 serve as inlets 41 and 42, and the pistons 35 and 36 of the valve are arranged so that one valve port is connected with one inlet and the other valve port is connected with the outlet. Valve shaft 37 is provided with valve stop collars 43 and 44, one at each side of projection 38, to limit its range of movement.

The support 39 is preferably U-shaped with substantially parallel sides or arms 138 and 139. Upon a stud 45 extending inward from arm 138 of support 39 a valve trip spring thrust arm or lever 46 is pivoted. The lower end of this arm fits somewhat loosely in a yoke 47 that is pivoted in the outer end of shaft 37. This arm 46 carries a stud 48 in the lower end thereof to which one end of a valve trip spring 49 is connected. The upper end of this spring is carried by the lower end of a valve trip arm or lever 50 that is pivoted on a stud 51 extending inward from arm 139 of support 39 in vertical alinement with stud 45. The upper end of valve trip arm 50 is located between two valve trip collars 52 and 53 secured to shaft 15 by suitable means, such as pins 54. A valve mechanism cover 55 is secured to housing section 11 and valve casing 26 by bolts 27 and 56. This cover 55 encloses the outer end of motor shaft 15, valve shaft 37, and the interconnecting valve mechanism, and it is provided with a gas inlet 42'.

This motor operates as follows: Starting with the parts in the position shown in Fig. 1, gas enters inlets 42' and 42, passes through valve passage 28 and valve port 31 into chamber 32. Pressure of this gas on diaphragm 12 moves it to the left. This movement continues until valve trip collar 53 by moving the upper end of valve trip arm 50 to the left has moved the lower end of this arm carrying valve trip spring 49 far enough to the right of the axis of thrust arm 46 to produce a component of force of spring 49 in that direction sufficient to overcome the friction of the valve parts, and move shaft 37 by means of arm 46 and yoke 47 to the right until the movement of valve stop collar 43 is arrested by projection 38. With the valve in this position gas enters inlet 41 and passes through valve passage 28 and valve port 29 into chamber 30. Pressure of this gas moves the diaphragm to the right and the gas in chamber 32 passes out through valve port 31 and the space between valve pistons 35 and 36 to exhaust port 33 and outlet 34. When valve trip collar 52 has moved valve trip arm 50 for enough to the right valve trip spring 49 will instantly move valve shaft 37 and the valve back to the position shown in Fig. 1. Therefore, as long as gas is being drawn from the outlet 34 of the motor, the movable parts of the motor will continue to oscillate.

Means of transmitting movement from the motor to the carbide valve is shown in Figs. 2 and 3. These figures show a portion of an acetylene generator having a casing 57 and a carbide hopper 58. A valve 59 is carried by a vertical shaft 60 at the outlet of hopper 58. This shaft is carried by supports 61 and 62 in which it is free to rotate and also oscillate vertically. The vertical movement is controlled by an arm 63 and a link 64 by which it is attached to a diaphragm 65 responsive to the pressure within the generator.

One side of valve 59 is provided with a projecting arm 66 having an opening 66a in which one end of a link or rod 67 is movably mounted. The other end of link 67 is movably mounted in an opening 15a in the outer end of shaft 15 of my improved motor 68 which is carried by supports 69 within casing 57. The outlet 34 of motor 68 is connected to a pipe 70 that leads outward through casing 57 and forms the outlet of the generator. During operation of this generator by the use of a heating stove or illuminating burner, gas is drawn from pipe 70 through motor 68 causing shaft 15 to reciprocate and oscillate valve 59 and shaft 60 in supports 61 and 62. As the pressure of the gas within the generator is reduced diaphragm 65 and its associated mechanism opens carbide valve 59 in a manner well known in the art. Therefore, as long as gas is being drawn from the generator carbide feed valve 59 will be oscillated by motor 68 and carbide will feed past the valve at a more uniform rate than it would if it were not oscillated. Furthermore, the speed of oscillation will be proportional to the amount of gas drawn from the generator and consequently in proportion to the amount of carbide fed past the feed valve. This variable movement provides a better carbide feed than one that does not vary according to the amount of carbide required by the generator.

By locating the motor within the generator casing any slight leaks through gland 18 or past valve pistons 35 and 36 will cause no detrimental result whatever. It will be seen that it is unnecessary to provide packing on the valve stem, which packing might cause the stem to bind and interfere with the free operation of the valve. Also, by locating the valve ports 29 and 31 at the bottom of the housing any moisture that condenses within chambers 30 and 32 will be drained into the inside of the generator casing or into the outlet 34 and therefore will not interfere with the operation of the motor.

It is the object of this motor to cause the agitation or movement of the carbide valve when gas is drawn from the generator, but the type of motion and the means for conveying it may be different from that shown. Where no material has been mentioned it is understood that the parts are constructed of materials well known in the art, and where they are mentioned it is understood that equivalent materials may be substituted. These and other changes, substitutions, and arrangements, may be made without departing from the spirit of the invention and the scope of the claims.

I claim:—

1. In a motor; a housing comprising two chambers; a piston element operating in said chambers; a straight valve passage extending directly through said housing having a separate inlet at each end thereof for gas surrounding said housing; a valve in said passage for alternately connecting each of said chambers with one of said inlets respectively; a valve stem connected to said valve and passing freely out of said passage; and means for operating said stem in response to movements of said piston element, said operating means including means for holding said valve in an operative position for substantially the full stroke of said piston element and for precluding the arrest of said valve in a dead center position.

2. In a motor; a housing having two chambers therein; a diaphragm separating said chambers; a motor shaft joined to said diaphragm and extending outward through said housing; a valve passage through said housing having an inlet at each end thereof located below said chambers; a valve port leading from the bottom of each of said chambers to the top of said valve passage; an exhaust port leading downward from the bottom of said valve passage to the outside of said motor; a valve freely movable between limits in said valve passage; and means for operating said valve by said motor shaft, said operating means including means for causing said valve to hold in the normal operating position during substantially the full stroke of said motor shaft and for precluding the arrest of said valve in a position closing off said valve ports.

3. In a motor comprising a housing; a horizontal reciprocating motor shaft; a valve; a horizontal reciprocating valve shaft connected to said valve and extending externally of said housing out of contact therewith; a yoke carried by the outer end of said valve shaft; a support carried by said housing; a valve trip spring thrust arm pivoted to said support and movable in said yoke; a valve trip arm pivoted to said support in vertical alinement with the pivot of said thrust arm to change the direction of force applied to said thrust arm; a valve trip spring carried under tension between the lower end of said valve trip arm and said thrust arm to apply force to said thrust arm; and means carried by said motor shaft for moving said valve trip arm to move said valve quickly from one limit of its travel to the other.

4. In a motor having a piston element and a valve for controlling the direction of movement thereof; a housing for said valve having ends open externally; a piston rod secured to said piston; a lever; means on said piston rod for moving said lever; a spring operably connected with said lever so that the direction of pull thereof is changed by the position of said lever; an arm operably connected with said spring and movable thereby in either direction between two limits of travel according to the position of said lever; a valve stem secured to said valve passing freely through one of said open ends; a yoke operably connecting said arm and said valve stem; and means for limiting the movement of said valve stem.

5. In a motor; a housing; a diaphragm in said housing; a motor shaft connected to said diaphragm and extending outwardly through one wall of said housing; two valve trip collars on said motor shaft; a support carried by said housing; a valve passage adjacent the lower portion of said housing having ends open to the ambient atmosphere; a valve in said passage; a valve stem joined to said valve passing freely through one of said open ends and movably guided in said support; a stop collar on said valve stem at each side of said support to limit the movement of said valve; a yoke carried by said valve stem; a thrust arm having one end mounted on a pivot secured to said support and one end movable in said yoke with said valve stem; a spring having one end secured to the free end of said thrust arm; a valve trip lever pivoted on said support having a movable arm secured to the other end of said spring to change the direction of the moving force applied to said thrust arm, and an integral arm disposed between said trip collars to move said lever.

MAURICE P. DE MOTTE.